March 23, 1937.                    J. GATTONI                    2,074,384
                                PRECISION BALANCE
                    Original Filed Aug. 24, 1932      2 Sheets-Sheet 1
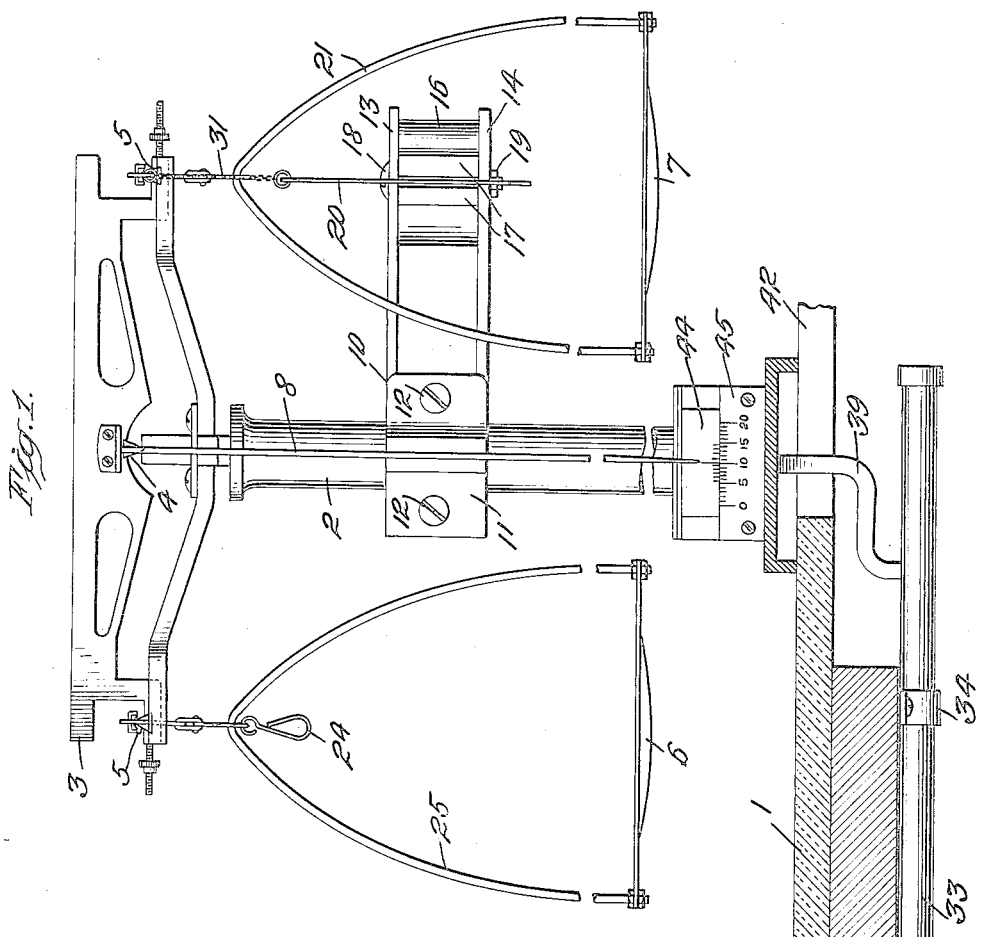
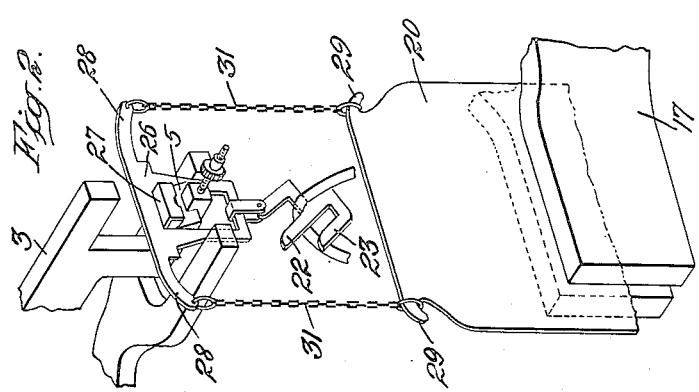
INVENTOR
JOHN GATTONI
BY D. Malcolm
ATTORNEY March 23, 1937. J. GATTONI 2,074,384
PRECISION BALANCE
Original Filed Aug. 24, 1932 2 Sheets-Sheet 2
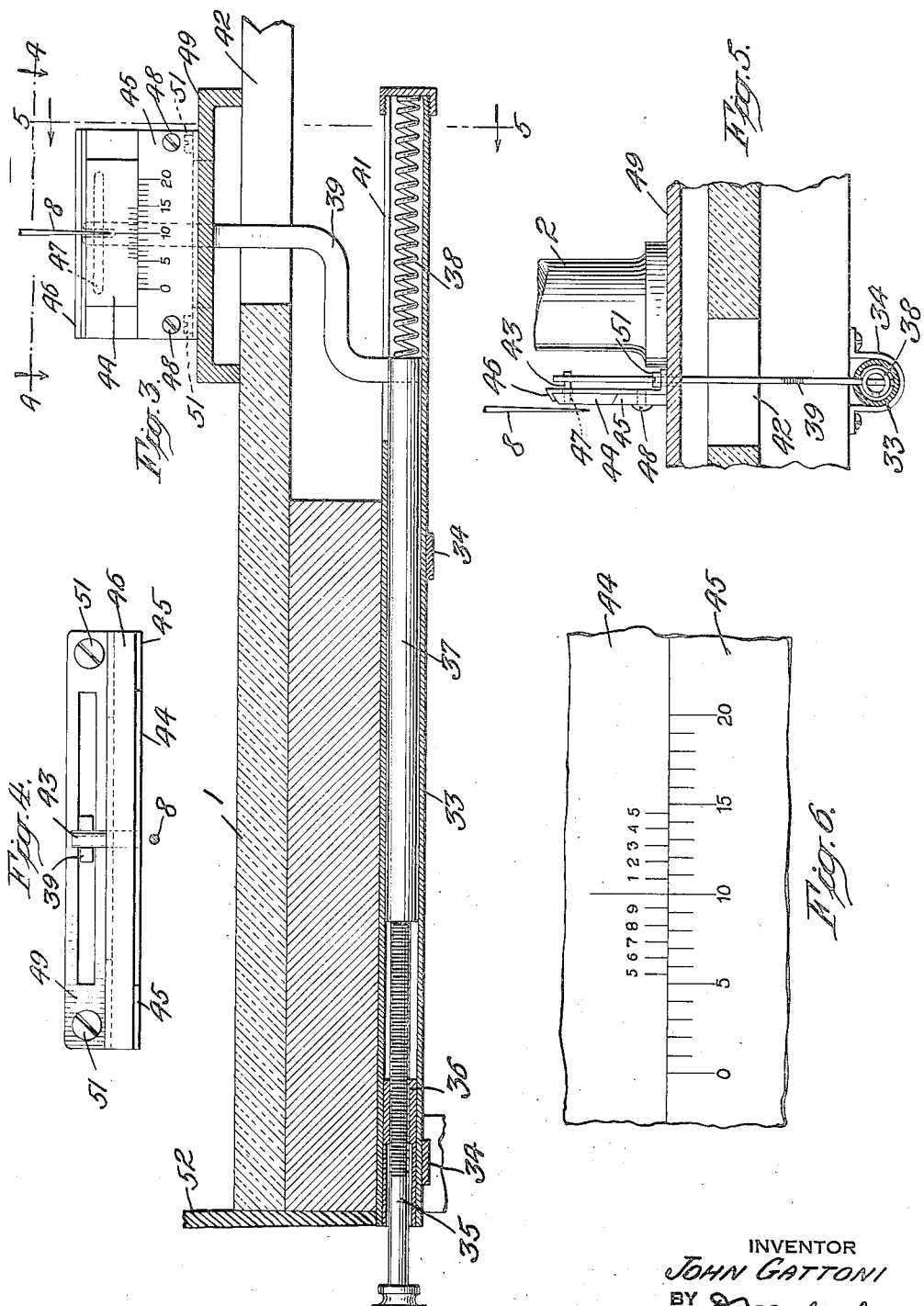
INVENTOR
JOHN GATTONI
BY D. Malcolm
ATTORNEY Patented Mar. 23, 1937

2,074,384

UNITED STATES PATENT OFFICE 2,074,384

PRECISION BALANCE

John Gattoni, Union City, N. J., assignor to Seederer-Kohlbusch, Inc., Jersey City, N. J., a corporation of New Jersey Original application August 24, 1932, Serial No. 630,229, now Patent No. 1,997,636. Divided and this application April 13, 1935, Serial No. 16,222

3 Claims. (Cl. 265—54)

This invention relates to a precision balance and is a division of my application Serial No. 630,229, filed August 24, 1932 which has matured into Patent Number 1,997,636.

The object of the invention is to provide means for quickly and accurately weighing objects of relatively small mass and obtaining very fine and delicate readings thereof.

The invention is particularly applicable to sensitive laboratory and analytical balances which are used for measuring very light weights. In ordinary undamped balances of this type the beam oscillates freely and it frequently takes five minutes or longer for the scale pans to come to rest during a weighing operation. Some operators never wait for the pans to come to rest, but simply count the divisions on opposite sides of the zero line traversed by the indicator, and take the means, which is at best an uncertain and inaccurate method of weighing.

I overcome these difficulties by providing an improved index and an improved combination of pivoted beam, magnetic damper and index, which enables delicate and accurate readings to be taken in a fraction of the time heretofore required. The balance is preferably of the type disclosed and claimed in my Patent #1,900,641, dated March 7, 1933, comprising a pivoted beam carrying a suspended scale pan, a magnet having closely spaced poles mounted between the beam and scale pan, and a damping plate pivotally suspended from the beam independently of the scale pan and adapted to move between the poles of the magnet to dampen vibrations of the beam whereby swinging movements of the scale pan are isolated from the damping plate. The beam carries a pointer or indicator and in combination with said indicator I provide a movable scale and means for quickly moving said scale into operative relation with said indicator to give a clear reading of the weight at almost the instant the indicator comes to rest, which is about ten or fifteen seconds from the time the beam starts oscillating.

In my preferred combination, in addition to the main indicator which is carried by the pivoted beam, I provide a scale including a second indicator which is adapted to cooperate with the main indicator, and an operating member for moving the scale and second indicator into cooperation with the main indicator. When the first or main indicator comes to rest, the operating member is moved to bring the second indicator into alignment with the main indicator, which can be accomplished almost instantaneously, after which. the operator simply reads the weight from the scale.

My balance is preferably mounted in a casing of the type having a glass door which is closed to exclude air currents during the weighing operation and my combination has the important advantage of enabling the movable scale and associated mechanism to be controlled entirely from outside the casing and the readings to be taken by merely glancing through the glass door without changing the operator's position or straining his eyesight. These and other features and advantages of the invention will be apparent from the following description.

Referring now to the drawings,

Fig. 1 is a front elevational view, partly in section, showing a balance embodying the invention;

Fig. 2 is a perspective view of the damping plate and associated parts;

Fig. 3 is a vertical sectional view of the reading scale actuating mechanism;

Fig. 4 is a horizontal section taken on line 4—4 of Fig. 3;

Fig. 5 is a vertical section taken on line 5—5 of Fig. 3; and

Fig. 6 is an enlarged detail view of the reading scale.

In the drawings, 1 is a suitable base on which is mounted support 2, on the upper end of which the beam 3 is mounted on the usual knife edge 4. The beam carries knife edges 5 at its ends on which are hung the scale pans 6 and 7. Also attached to the beam is the usual indicator 8.

10 is a curved magnet supporting arm clamped to support 2 by cap 11 and screws 12, so as to be adjustable vertically as well as horizontally. The end of arm 10 is divided to provide separate clamping plates 13 and 14 between which a permanent magnet 16 having poles 17 is adjustably clamped by set screw 18 and nut 19. The ordinary adjustment will be to move the magnet back and forth gradually relative to the damping plate 20 so as to get the latter symmetrically of the field where maximum damping effect is wanted and asymmetrically of the field where less damping effect is required. The poles of the magnet are closely spaced to provide a concentration of flux in the path of the damping plate. The scale pan 7 is supported by a bow 21 which is suspended from knife edge 5 in any suitable manner. Preferably, it is hung on an upper hook 22 which may be on the same end of the beam as damping plate 20, and if a magnet is used at only one end of the beam, then the lower hook 23 over pan 6 will carry a small weight 24 to balance the damping plate 20. 25 is the corresponding bow for pan 6 which is hung on hook 22 directly above hook 23 which carries weight 24. Each double hook 22—23 is attached to a yoke frame 26 which carries agate bearing 27 resting on knife edge 5 at the end of the beam. The yoke frame 26 above pan 7 carries extensions 28 from which the damping plate 20, having hooks 29, is suspended by light chains 31, as little mass as possible being desired in the moving system.

A tube 33 secured to the underside of base 1 by clamps 34, encloses a threaded rod 35 guided in bushing 36. Rod 35 is adapted to move a plunger 37 against the action of a spring 38 as shown in Fig. 3. A curved arm 39 carried by plunger 37 passes through a slot 41 in tube 33 and an opening 42 in base 1, and is slotted at its free end. A pin or indicator 43 engages the slotted end of arm 39 and carries a movable graduated dial or scale 44 adapted to cooperate with graduated scale 45. The movable scale 44 is guided in its movement by scale 45 and a plate 46 having a slot 47 through which pin 43 passes. Graduated scale 45 is secured to plate 46 by means of screws 48, and plate 46 is secured to platform 49 on the base 1 by means of screws 51. Upon rotation of shaft 35, plunger 37 is moved until indicator pin 43 is brought into alignment with indicator 8, and a reading is obtained from scales 44 and 45 in accordance with the usual vernier practice.

In operation, the damping plate 20 moves up and down between the poles of the magnet and the eddy currents set up by moving the plate through the field dampen the motion of the beam and quickly bring the pans and the indicator 8 to rest. The yoke frame supports the damping plate and the adjacent scale pan independently and out of contact with each other so that swinging movements of the scale pan are isolated from the damping plate and cannot force the damping plate against the magnet poles which would seriously affect the sensitivity and accuracy of the balance. At the instant the indicator 8 comes to rest the operator, by a simple and almost instantaneous movement of rod 35 from outside the casing 52, effects the required adjustment and takes the exact reading without having to take a mean, and without even changing his position.

It will be understood that various modifications and adaptations may be made without departing from the scope of the invention as indicated in the accompanying claims.

The invention claimed is:

1. In a balance, a pivoted beam, an indicator carried by said beam, a scale cooperating with said indicator, a second scale cooperating with said first scale and said indicator, a tube containing a spring, a plunger in said tube adapted to move against the action of said spring, means for supporting said second scale on said plunger, and means for actuating said plunger.

2. In a balance, a pivoted beam, an indicator carried by said beam, a scale cooperating with said indicator, a second scale cooperating with said first scale and said indicator, a tube containing a spring, a plunger in said tube adapted to move against the action of said spring, means for supporting said second scale from said plunger, and a rotatable shaft threaded in said tube in contact with said plunger for actuating same.

3. In a balance, a casing, a support therein, a beam pivoted on said support, an indicator carried by said beam, a scale cooperating with said indicator, a spring-pressed plunger, a threaded shaft extending through said casing in contact with said plunger for moving same, means outside said casing for turning said shaft, a tube substantially enclosing said spring, plunger and threaded shaft, a second scale actuated by said plunger and adapted to cooperate with said first scale, and a second indicator on said second scale for cooperation with said first indicator.

JOHN GATTONI.